United States Patent [19]
Pniewski

[11] 3,801,005
[45] Apr. 2, 1974

[54] NONREVERSIBLE ODOMETER

[75] Inventor: Gary A. Pniewski, Redford, Mich.

[73] Assignee: Ford Motor Company, Dearborn, Mich.

[22] Filed: Apr. 2, 1973

[21] Appl. No.: 347,267

[52] U.S. Cl............ 235/95 R, 235/1 C, 235/131 R
[51] Int. Cl..................... G01d 13/04, G01c 22/00
[58] Field of Search........ 235/95 R, 96, 117 R, 1 C, 235/131 JA, 131 R; 192/46

[56] References Cited
UNITED STATES PATENTS

| | | | |
|---|---|---|---|
| 2,920,816 | 1/1960 | Greenhow | 235/1 C |
| 3,458,127 | 7/1969 | Hermann | 235/95 R |
| 3,471,085 | 10/1969 | Soupenne | 235/131 R |
| 3,506,191 | 4/1970 | Allen | 235/1 C |
| 3,667,671 | 6/1972 | Hachtel | 235/96 |

Primary Examiner—Stephen J. Tomsky
Attorney, Agent, or Firm—Keith L. Zerschling; Robert A. Benziger

[57] ABSTRACT

A nonreversible odometer for a vehicle includes a plurality of driven number wheels which display the distance traveled by the vehicle. The gear train of the odometer is designed so that an input thereto which increases the indicated travel of the vehicle is transmitted through the gear train to increase the traveled distance displayed on the number wheels. On the other hand, if the input to the odometer is one which would decrease the displayed indicated travel of the vehicle, the drive between the transfer gear and the first, or tenths wheel, of the number wheels is interrupted and no significant decrease is effected. The first, or tenths, wheel is also provided with a pair of up-counting pinion locking means which are operative to establish a locked meshing engagement between the number wheels and the up-counting pinion gears.

8 Claims, 10 Drawing Figures

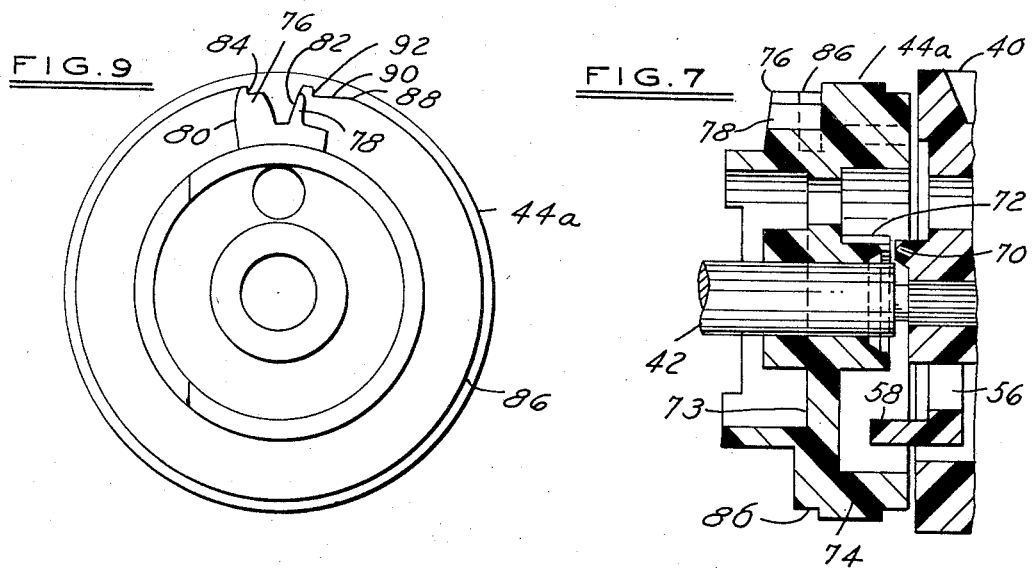
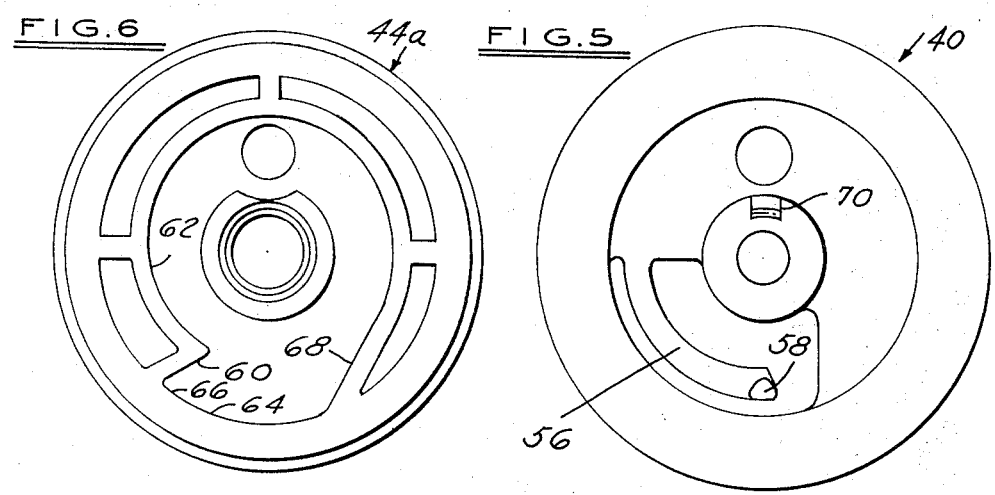
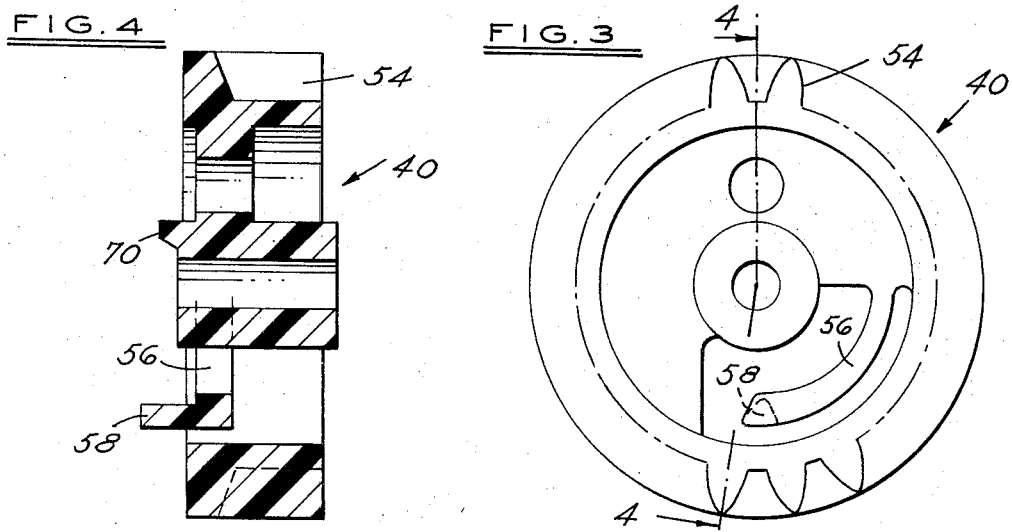

NONREVERSIBLE ODOMETER

BACKGROUND OF THE INVENTION

1. Field Of The Invention

The present invention relates to the field of distance traveled measuring odometers in general and in particular to that portion of the above noted field which is concerned with nonreversible odometers, for example for automobiles. More particularly still, the present invention is concerned with a means for decoupling the distance indicating portion of the odometer from the driving means in the event of vehicle motion in a down-counting direction and is further concerned with means for providing a locked meshing engagement for the number wheels and up-counting pinion gears of an odometer to prevent "turning back" of the odometer reading.

2. Description Of The Prior Art

U.S. Pat. No. 3,506,191 issued to Ivis J. Allen and entitled "Shaft Construction For Non-reversible Odometer" and U.S. Pat. No. 3,636,320 issued to George C. Wallis and entitled "Nonreversible Odometer," both of which are assigned to the assignee of the present invention, are directed to two approaches for providing a nonreversible odometer. Each of these patents teaches a two piece drive shaft which is adapted on one end to be driven by an input mechanism and adapted on the other end to drivingly engage the number of wheels of the distance indicating portion of the odometer. Each patent teaches that the interconnection between the two shaft ends is arranged to provide a one-way (up-counting only) drive so that motion which would tend to reduce the distance indication would disconnect or terminate the driving relation between the two ends of the input shaft to therefore prevent reduction of the distance indication. Such two piece shaft arrangements are relatively expensive when compared with a single piece drive shaft which may be made, for example, out of a molded plastic and need not have any unusual or fragile components or shapes and need not require an assembly operation. It is, therefore, an object of the present invention to provide a distance indicating odometer structure which is simpler to manufacture and assemble than the prior art types of nonreversible odometers.

A further problem which has been encountered with the odometer structures according to the prior art has resulted from the fact that transportation of the vehicle having such an odometer long distances by rail, such as predelivery shipment to a dealer, can result in vibration of the vehicle, as is normally encountered by rail shipments. This vibration may occur at such a frequency and intensity that the number wheel driving portion of the input shaft assembly may be driven in an overrunning relationship with respect to the driven portion of the input shaft and may therefore cause a mileage reading to appear on the odometer of the vehicle when in fact the vehicle has not traveled any distance at all. This overrunning drive relationship results primarily from the fact that the torque loading required to rotate the number wheels are infinitesimally small while a substantial mechanical advantage is present in the gear connection between the driving portion of the input shaft and the number wheels. In order to overcome this difficulty, a friction load has been required to be added to the distance indicating portion of the odometer so that a level of minimum torque in excess of that produced by simple vibration is required in order to turn the number wheels of the distance indicating portion of the odometer. This has thus necessitated in the addition of further structure to the odometer increasing the material and assembly cost of the odometer. It is, therefore, a still further object of the present invention to provide a nonreversing feature to a distance indicating odometer which is not susceptible to vibration induced up-counting. Keeping the last mentioned objective in mind, it is a still further object of the present invention to provide a distance indicating odometer structure in which the amount of torque required to rotate the least significant digit in the absence of driving engagement increases as a function of the position of that digit.

The prior art devices have relied upon the mere disconnection or termination of the driving relationship in the input shaft to prevent down-counting of the distance indicating portion of the odometer. It is, therefore, a further object of the present invention to provide a positive locking arrangement by which down counting of the distance indicating portion of an odometer structure may be prevented.

Distance indicating portions of odometer structures have heretofore relied upon a pair of substantially symmetrical up-counting pinion engaging teeth on one number wheel to provide the desired indexing operation. It is, therefore, a more specific object of the present invention to provide up-counting pinion engaging teeth which will provide a smooth indexing rotation of the pinion upon engagement with the pinion in a first direction and which will enter a locking or binding meshing relation with the up-counting pinion upon rotation in a second direction.

SUMMARY OF THE PRESENT INVENTION

The present invention provides for a unidirectional drive connection between a transfer gear which is bidirectionally coupled to an input drive mechanism and the least significant digit number wheel in the distance indicating portion of an odometer structure. This unidirectional drive connection is provided by a resiliently connected drive pin coupled to the transfer gear and arranged to engage in a first direction in wedging abutment with a ramp surface provided therefor on the least significant digit number wheel and arranged in a second direction to engage a ramp surface whereby the driving connection will be broken through ratcheting action. The invention further provides a pair of non-symmetrical up-counting pinion engaging teeth which are operative to rotate the pinion in a first direction and to bind with the pinion in a second direction whereby down-counting of the distance indicating portion of the odometer structure may be prevented.

The up-counting pinion engaging teeth are non-symmetrical in a circumferential direction to provide for first and second pinion teeth drive surfaces which are suitable spaced to provide smooth rolling or indexing action of the pinion and first and second pinion teeth engaging notches which are suitably spaced in serial relationship to each other to receive and bind with pinion teeth in the event a down-counting rotation of the least significant digit number wheel is encountered.

BRIEF DESCRIPTION OF THE DRAWINGS

FIG. 3 is an elevational view of the transfer gear according to the present invention.

FIG. 4 is a sectional view of the transfer gear of the present invention taken along the line 4—4 of FIG. 3.

FIG. 5 is a further elevational view of the transfer gear of FIG. 3.

FIG. 6 is an elevational view of the least significant digit number wheel according to the present invention.

FIG. 7 is a sectional view of the mating relationship of the transfer gear and the least significant digit number wheel according to the present invention.

FIG. 9 is an elevational view of the least significant digit number wheel including the pinion binding mechanism according to the present invention.

DETAILED DESCRIPTION OF THE PREFERRED EMBODIMENT

Figure 1:
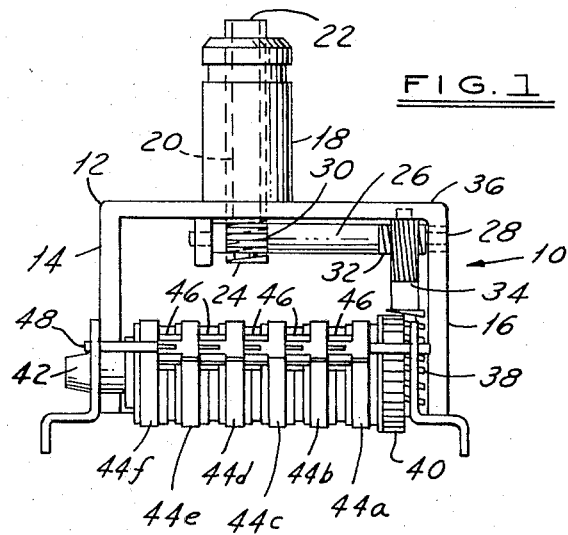
FIG. 1 is a plan view of the nonreversible odometer formed in accordance with the teachings of this invention.

Referring now to FIG. 1, a nonreversing odometer according to the present invention is shown and generally identified by the numeral 10. The odometer has a frame 12 having sidewalls 14 and 16 as well as a tubular housing 18 extending therefrom. The tubular housing 18 has an internal bearing 20 shown in phantom lines which supports for rotative movement therein an input shaft 22. One end of shaft 22 is coupled to and driven by a speedometer or odometer input device which is driven in a known manner by some portion of a motor vehicle such as the transmission. A gear 24 is formed on the portion of the input shaft 22 which extends into the space between the side walls 14, 16 of the odometer frame 12.

A cross shaft 26 is supported at its right end (as viewed in FIG. 1) in a bearing surface 28 formed in the sidewall 16 of the frame 12 or pressed into a hole formed therefor. The cross shaft 26 has a gear 30 formed thereon which is in meshing engagement with gear 24 of the input shaft 22. The cross shaft 26 also has a second gear 32 formed on its end adjacent side wall 16 of frame 12.

Drive shaft 34 is arranged to be driven at one end by gear 32 and supported for rotation at the one end in a bearing surface 36 formed in the back portion of frame 12 and at the other end in a bearing surface formed in a housing member. This housing member is attached to and supported at opposite ends by side walls 14, 16 of frame 12. Drive shaft 34 is provided with a worm gear surface 38 arranged to engage transfer gear 40. Transfer gear 40 is in the form of a spur gear and is arranged on a common shaft 42 with a plurality, in this case six, of number wheels 44. As illustrated, number wheels 44 represent the six digits ordinarily provided on a vehicle odometer. The right hand most number wheel 44a represents the tenths digits while the left hand most number 44f represents the ten thousands digits. A plurality of up-counting pinion gears 46 are arranged on a common axis or shaft 48 to drivingly interconnect successive pairs of number wheels 44.

Figure 2:
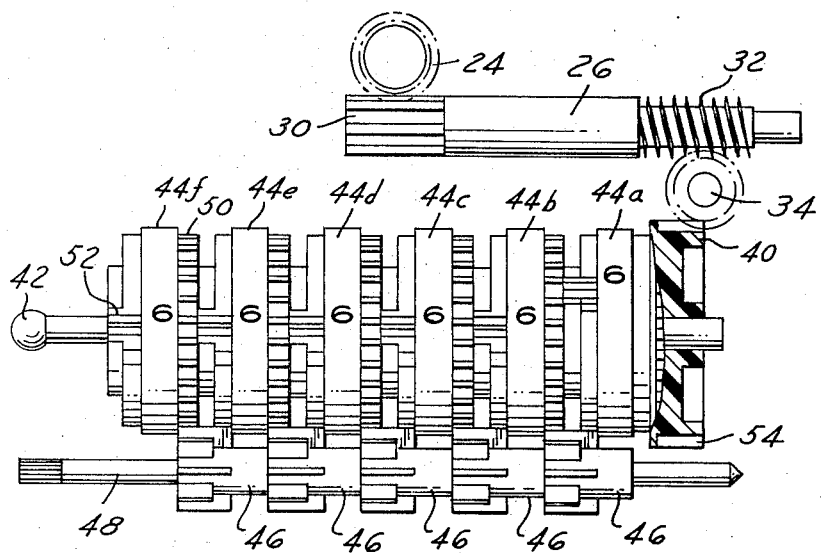
FIG. 2 is a semi-diagrammatic enlarged view of the distance indicating and gear drive portions of the odometer of FIG. 1.

With reference now particularly to FIG. 2, each number wheel, for example, number wheel 44f, is provided with first and second gear tooth sets identified as numbers 50 and 52. Gear set 50 is comprised of a plurality of equidistantly spaced gear teeth arranged around the circumference of a portion of number wheel 44. Gear set 52 is comprised of a significantly smaller number of gear teeth, which may also be termed the transfer teeth, in a ratio of 1:10 in comparison with the gear teeth of the gear set 50. In the illustrated embodiment, gear set 50 will be comprised of 20 gear teeth while gear set 52 would be comprised of two transfer gear teeth. The gear teeth in each gear set would be arranged so that rotation of number wheel 44e ten times would produce one complete rotation of number wheel 44f through the action of the up-counting pinion 46 which interconnects these two number wheels.

Referring now to FIGS. 3, 4 and 5, transfer gear 40 is illustrated. Transfer gear 40 is illustrated as being a substantially circular spur member having a plurality of substantially identical spur gear teeth 54 arranged about the circumference of the gear. With reference of FIGS. 1, 2 and 3, the spur gear teeth 54 are arranged to be driven by the worm gear 38 of the drive shaft 34. The driving relation between the speedometer input shaft 22 and the spur gear teeth 54 as illustrated will therefore be seen to be a mechanically locked connection so that rotation of shaft 22 in either direction will produce a matching rotation of transfer gear 40. According to the present invention, transfer gear 40 is provided with arcuately shaped cantilever mounted resilient member 56 having a drive pin 58 extending therefrom. Drive pin 58 is located at the remote end of resilient member 56 and may thus execute limited substantially radial motion with respect to the axis of rotation of transfer gear 40. As particularly illustrated in FIG. 4, drive pin 58 extends a substantial distance away from, or leftward relative to FIG. 4, the main body of transfer gear 40.

Referring now to FIG. 6, the least significant digit number wheel 44a is illustrated in an elevational view. Drive pin engaging ramp surface 60 is provided extending radially outward from a generally cylindrical surface 62 and radially inwardly from a generally cylindrical surface 64 to define a drive pin abutment pocket 66. Generally cylindrical surface 64 is radially more remote from the axis of rotation of number wheel 44a than is drive pin 58 from the axis of rotation (the common axis) of transfer gear 40 while generally cylindrical surface 62 is radially less remote from the common axis than in drive pin 58. Second ramp surface 68 interconnects the inner and outer generally cylindrical surfaces 62 and 64 in a relatively smoother fashion than drive pin engaging surface 60.

With particular reference to FIG. 7, the interrelationship of transfer gear 40 and the least significant digit number wheel 44a is illustrated in a sectional view. Locating pin 70 can be seen to project only slightly in the axial direction to avoid frictional loading on the number wheel 44a. Locating pin 70 is provided merely to facilitate automated assembly. Number wheel 44a can be seen to have an axial hub 72 connected by a web 73 to a generally cylindrical outer housing 74 so as to define a region between the hub 72 and the outer portion 74 into which drive pin 58 may axially extend to engage ramp surface 60 (not shown in FIG. 7) in the driving direction.

Figure 8:
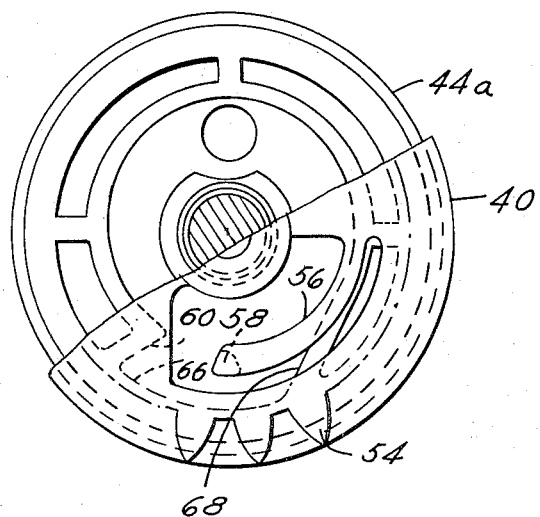
FIG. 8 is a partially elevational partly sectioned view of the transfer gear and its driving relation to the least significant digit number wheel.

Referring now to FIG. 8 wherein the least significant digit number wheel 44a and the transfer gear 40 are shown with a portion of transfer gear 40 shown broken away for clarity, the operation of the unidirectional drive mechanism of the present invention is illustrated and described. Rotation of transfer gear 40 through the interaction of input drive shaft 34 and spur gear teeth 54 will cause drive pin 58 to rotate clockwise or counterclockwise relative to the drawing of FIG. 8. Clockwise rotation of transfer gear 40 will cause drive pin 58 to rotate into contactive abutment with ramp surface 60. Due to the angular relationship of ramp 60, and because of the resilient nature of resilient means 56, drive pin 58 will be forced into the abutment pocket 66 establishing a driving relationship between transfer gear 40 and number wheel 44a so that number wheel 44a is driven in a clockwise direction. This corresponds to an increasing distance indication for the odometer according to the present invention.

In the event that the vehicle is moved in a direction which would ordinarily reduce the distance indication, as for example, in backing up of the vehicle, the transfer gear 40 will be driven in a counterclockwise direction. This will cause drive pin 58 to be brought into contact with the ramp surface 68. Since ramp surface 68 presents in this direction a relatively gradual reduction in radius, resilient means 56 will be biased radially inwardly and drive pin 58 will slide along ramp surface 68 until it reaches the generally cylindrical surface 62 and will then slide along that surface ratcheting across the junction of generally cylindrical surface 62 and ramp surface 60. It can thus be seen that rotary motion of transfer gear 40 in this direction will be operative to disengage the driving connection between the transfer gear 40 and the least significant digit number wheel 44a. In the event that the resilient means 56 and drive pin 58 cooperate with surface 56, upon reverse rotation, such that sufficient friction forces are generated to develop a torque capable of rotating the number wheel 44a, the antirotation locking means described hereinbelow may be advantageously used.

Referring now to FIG. 9, an elevational side view of least significant digit number wheel 44a opposite to the view illustrated in FIG. 6 is shown. In this view, the up-counting pinion gear drive teeth 76, 78 are illustrated. Drive tooth 76 includes pinion tooth engaging surface 80 while drive tooth 78 includes pinion tooth engaging surface 82. The pinion tooth engaging surfaces 80, 82 are spaced apart a distance approximately equal to the distance required to engage with the pinion teeth of an up-counting pinion 46. This distance substantially corresponds to the distance between adjacent ones of the teeth of the first and second gear sets 50, 52 illustrated in FIG. 2. Drive tooth 76 is substantially thicker than drive tooth 78 and includes a stepped notch 84 near its crown.

With particular reference now to FIGS. 7 and 9, it can be seen that a generally cylindrical surface substantially surrounds a major portion of the least significant digit number wheel 44a as identified by numeral 86. Drive or transfer teeth 76, 78 extend axially from the side of number wheel 44a and in particular from a portion of the cylindrical surface 86. Drive tooth 76 extends to a slightly greater extent in the radial direction than does drive tooth 78. Cylindrical surface 86 extends from the crown of drive tooth 76 around the major portion of the least significant digit number wheel 44a to a point identified as 88 which is slightly to the right relative to FIG. 9 of drive tooth 78. A generally inwardly directed ramp surface extends from point 88 to the vicinity of drive tooth 78 and terminates in a further stepped notch 92.

Figure 10:
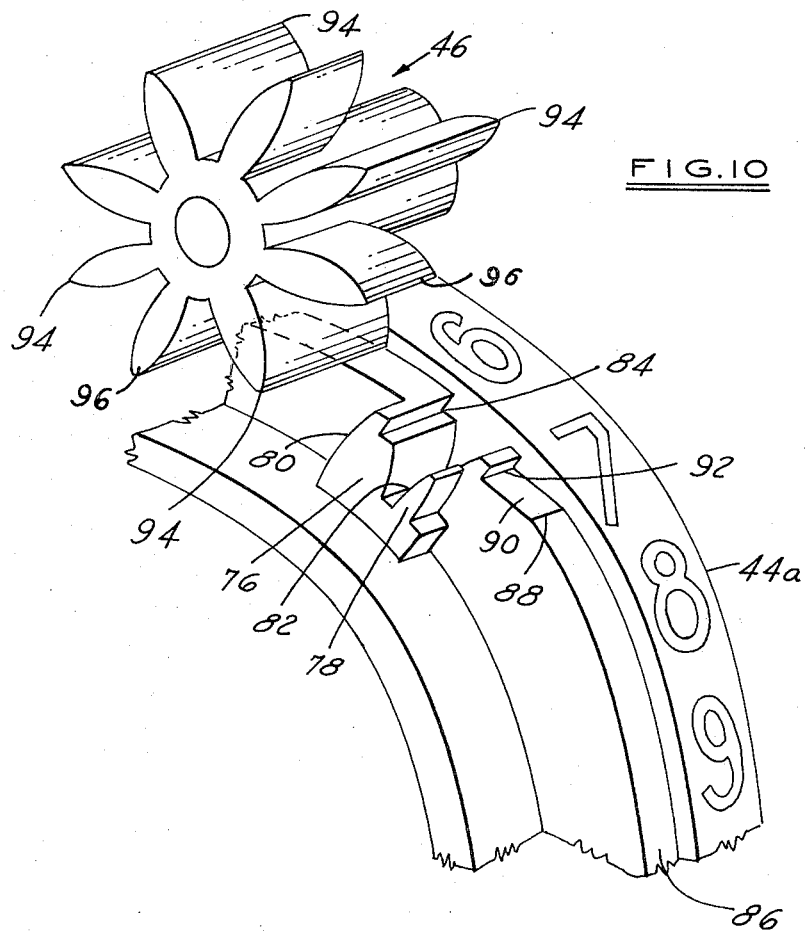
FIG. 10 is an enlarged perspective view of a portion of the least significant digit number wheel and its associated up-counting pinion illustrating the operation of the pinion binding mechanism according to the present invention.

With reference now to FIG. 10, the significance of the above recited related structure is illustrated in an enlarged perspective broken away view of least significant digit number wheel 44a having up-counting pinion drive teeth 76, 78 cooperating with up-counting pinion 46. As illustrated, up-counting pinion 46 is provided with an even number, in this case 8, of pinion teeth alternate ones of which identified as 94 are substantially axially longer than the other ones. Upcounting pinion 46 is positioned relative to the number wheel 44 so that a pair of pinion teeth 94 may be in sliding contact with the surface 86 while an intermediate pinion tooth 96 extends generally radially inwardly relative to number wheel 44. Rotation of number wheel 44 in an up-counting direction will cause surface 80 to come into abutment with pinion tooth 96 and will rotate the pinion 46 so that the tooth 94 comes into registry with and is rotated into the void between drive or transfer teeth 76, 78. Further rotation of number wheel 44 in the up-counting direction will cause surface 82 to come into abutment with the pinion tooth 94 and will complete the rotary process whereby pinion 46 is rotated through two teeth positions. In the event of rotation of number wheel 44a in a down-counting direction, the tooth 94 which is riding upon the generally cylindrical surface 86 will through frictional forces be rotated into contact with the stepped notch 92 thereby providing for a locked abutment between the pinion tooth 94 and the number wheel 44a preventing any further change in the distance indication recorded by that number wheel. However, in the event that the pinion tooth 94 does not follow the inwardly directed ramp surface 90 so as to lock, as for example when there is high frictional resistance to rotation between pinion 46 and its associated axle or shaft, the then inwardly projecting pinion tooth 96 will come into abutment with the drive tooth 78 and will rotate pinion 46 counterclockwise relative to FIG. 10 so that a pinion tooth 94 will be rotated into positive locking engagement with stepped notch 84. For this reason, the root thickness of drive tooth 78 is substantially less than the root thickness of drive tooth 76 so as to provide the necessary distance spacing relationship for the secondary locking abutment.

It can be seen that the present invention readily accomplishes its stated objectives. A unidirectional drive connection is provided for the distance indicating portion of an odometer which must receive a positive driving input in order to increase the distance indication and the present invention further provides a first and a second down-counting locking mechanism to provide a positive locked meshing engagement whereby down-counting will be prevented.

The man of skill in this art will recognize that various changes and modifications may be made in the specific structure illustrated without departing from the spirit and scope of the present invention. For example, an idler gear may be interposed between the transfer gear and the least significant number wheel with the unidirectional drive connection being located specifically between the transfer gear and the idler gear and the least significant number wheel. The general term "number wheel" is therefore intended to include idler gears, if any, intermediate the transfer gear and the indicating number wheels when the transfer gear includes a portion of the unidirectional drive according to the present invention and the term "transfer gear means" is intended to include idler gears, if any when the transfer gear itself does not include a portion of the unidirectional drive according to the present invention. In the instance where the unidirectional drive according to the present invention interconnects a pair of idler gears, one of the pair is considered a "number wheel" while the other of the pair is at least a portion of the transfer gear means.

I claim:

1. A nonreversible odometer for use in a vehicle to indicate the distance traveled by the vehicle comprising in combination:
   a frame;
   an input shaft rotatably mounted in said frame, said shaft arranged to be driven by apparatus responsive to movement of the vehicle;
   a plurality of number wheels supported for rotation in said frame for displaying an indication of the distance traveled by the vehicle;
   gear train means, including transfer gear means rotatable in the plane of rotation of and on a common axis with the number wheels, supported by said frame for interconnecting said input shaft with a first one of said plurality of number wheels;
   a plurality of pinion gear members each rotatable on an axis spaced apart from said number wheel axis, said pinion gear members interconnecting pairs of said plurality of number wheels;
   said transfer gear means and said first number wheel including an axially extending drive pin spaced apart from the axis of rotation of said transfer gear means and connected to one of the transfer gear means and first number wheel by a cantilever resilient member lying substantially in the plane of rotation of its associated rotary member whereby said pin may execute limited radial movement;
   the other of said transfer gear means and first number wheel including a first ramp surface extending around a major angular portion of its associated rotary member intermediate the axis of rotation and the circumference thereof and a second ramp surface intersecting said first ramp surface at an angle no greater than 90°;
   said second ramp surface extending for a radial distance substantailly equal to the radial extent of said first ramp surface and being positioned with respect to said transfer gear means to be in intercepting relation with respect to said axially extending drive pin;
   said second ramp surface and said axial extending pin cooperative to drivingly couple said transfer gear means to said first number wheel, and said first ramp surface axially extending pin and resilient member cooperative to decouple said first number wheel and said transfer gear means.

2. The odometer according to claim 1 wherein each of said plurality of pinion gear members are provided with an even number of teeth adapted to engage mating teeth provided therefor on one axial side of the circumferential portion of one number wheel of a number wheel pair, said mating teeth being equidistantly spaced about the circumference thereof, said pinion gear members adapted to be driven by first and second transfer teeth provided on the axial side of the circumferential portion of the other number wheel of a number wheel pair, said first and second teeth being closely spaced whereby said first tooth and said second tooth will define an intertooth spacing approximately equal to the intertooth spacing of the mating teeth, alternate ones of said pinion teeth having an axial length greater than the axial length of the other pinion teeth; said first number wheel having an axially extending surface circumferentially directed about a major portion of said first number wheel, at a substantially constant radius, from the crown of said second tooth and having a radially inwardly directed ramp portion intersecting the first tooth intermediate the crown and the root thereof, said first tooth thereby extending radially outwardly therefrom to define in cooperation with said radially inwardly directed ramp portion a first antirotation locking location whereby antirotation of said transfer gear means and said first number wheel will permit an axially larger pinion tooth to become wedged between said ramp surface and said first tooth causing the numerical indication represented by the relative rotational positions of the number wheels to remain fixed while antirotation of said transfer gear means continues.

3. The odometer of claim 1 wherein each of said plurality of pinion gear members are provided with a plurality of equidistantly spaced gear teeth arranged to engage a plurality of mating teeth provided on one axial side of the circumferential portion of one number wheel of a number wheel pair and to be engaged by first and second transfer teeth provided on the other axial side of the circumferential portion of the other number wheel of a number wheel pair, said first and second transfer teeth being closely spaced and defining an intertooth spacing substantially equal to the intertooth spacing provided between said mating teeth, said first and second teeth cooperative upon forward rotation of the number wheel to which they are attached to successively engage a pair of teeth of the associated pinion and to rotate said pinion to index the companion number wheel of the number wheel pair to indicate one complete revolution of the other number wheel, said second tooth having a stepped rear surface arranged in intercepting relationship with respect to the pinion gear member whereby the crown of a pinion gear member tooth may be received by said second transfer tooth stepped rear surface upon rearward rotation of the other number wheel to establish a locked meshing engagement between said number wheels and said pinion gear members.

4. The odometer claimed in claim 3 wherein alternate ones of the teeth of said pinion gear means have an axial length greater than the other teeth of the pinion gear means, said first number wheel having an axially extending surface circumferentially extending at a substantially constant radius about a major portion of said first number wheel from the crown of said second transfer tooth and having a radially inwardly directed ramp portion intersecting said first transfer tooth intermediate the crown and the root thereof, said first transfer tooth thereby extending radially outwardly therefrom to define in cooperation with said radially inwardly directed ramp surface a first antirotation locking location whereby rearward rotation of said transfer gear means and said first number wheel will permit an axially larger pinion tooth to become wedged in said first locking location causing the numerical indication represented by the relative rotational positions of the number wheels to remain fixed through the meshing relation of said pinion gear means with said number wheels while rearward rotation of said transfer gear means continues.

5. A nonreversible odometer for use in a vehicle to indicate the distance traveled by the vehicle comprising in combination:
 a frame;
 an input shaft rotatably mounted in said frame, said shaft arranged to be driven by apparatus responsive to movement of the vehicle;
 a plurality of number wheels supported for rotation in said frame for displaying an indication of the distance traveled by the vehicle;
 gear train means, including transfer gear means rotatable in the plane of rotation of and on a common axis with the number wheels, supported by said frame for interconnecting said input shaft with a first one of said plurality of number wheels and further including a plurality of pinion gear members rotatable on an axis which is spaced apart from said number wheel axis, said pinion gear members interconnecting pairs of said plurality of number wheels;
 said gear train means including means defining a unidirectional drive whereby rotation of said input shaft in an up-counting direction will provide a positive driving connection between said gear train means and said number wheels and rotation of said input shaft in the opposite direction will terminate the positive driving connection;
 each of said pinion gear members being provided with a plurality of equidistantly spaced gear teeth arranged to engage a plurality of mating teeth provided on one axial side of the circumferential portion of one number wheel of a number wheel pair and to be engaged by first and second teeth provided on the other axial side of the circumferential portion of the other number wheel of a number wheel pair;
 said first and second transfer teeth being closely spaced and defining an intertooth spacing substantially equal to the intertooth spacing provided between said mating teeth;
 said first and second teeth cooperative upon foreward rotation of the other number wheel, to successively engage a pair of teeth of the associated pinion and to rotate said pinion to index the companion one number wheel to indicate one complete revolution of the other number wheel; and
 said second transfer tooth of said first number wheel having a stepped rear surface arranged in intercepting relationship with respect to the pinion gear member whereby the crown of a pinion gear member tooth may be received by said stepped rear surface upon rearward rotation of said first number wheel to establish a locked meshing engagement between the number wheels and the pinion gear members.

6. The odometer claimed in claim 5 wherein:
 said first number wheel has an axially extending surface circumferentially extending about a major portion of said first number wheel at a substantially constant radius from the crown of said second transfer tooth and having a radially inwardly directed ramp portion intersecting said first transfer tooth intermediate the crown and the root thereof, said first tooth thereby extending radially outwardly therefrom to define in cooperation with said radially inwardly directed ramp surface a first antirotation locking location whereby rearward rotation of said transfer gear means and said first number wheel will permit a pinion tooth to become wedged in said first locking location causing the numerical indication represented by the relative rotational positions of said number wheels to remain fixed through the meshing relation of the pinion gear means with the number wheels while rearward rotation of said gear train means continues.

7. A nonreversible count indicator comprising in combination:
 a frame;
 an input shaft rotatably mounted in said frame, said shaft arranged to be driven in proportion to the count to be indicated;
 a plurality of rotary members mounted on a common axis, at least some of which include numerical indicia arranged to be viewed;
 gear train means interconnecting said input shaft and one of said plurality of rotary members for transmitting the count indication from the drive shaft to the rotary members;
 unidirectional drive means intercommunicating said one rotary member with the rotary member representing the least significant digit of the count to be indicated and arranged to increase the count indication upon rotation of said first rotary member in a first direction and to terminate the positive driving relation between said first rotary member and said least significant digit rotary member upon rotation of said first rotary member in the opposite direction;
 a plurality of pinion gear members rotatable on an axis spaced apart from said common axis interconnecting selected pairs of said rotary members;
 each of said pinion gear members being provided with a plurality of equidistantly spaced gear teeth arranged to engage a plurality of mating teeth provided on one axial side of the circumferential portion of one member of said pairs of rotary members and to be engaged by first and second transfer teeth provided on the other axial side of the circumferential portion of the other member of said pairs of rotary members;
 said first and second teeth being closely spaced and defining an intertooth spacing substantially equal to the intertooth spacing provided between said mating teeth;
 said first and second teeth cooperative upon forward rotation of the other rotary member, to successively engage a pair of teeth of the associated pinion and to rotate said pinion to index the one rotary member to indicate one complete revolution of the other rotary member; and
 said second transfer tooth of at least one selected rotary member having a stepped rear surface arranged in intercepting relationship with respect to the pinion gear member whereby the crown of a pinion gear member tooth may be received by said stepped rear surface upon rearward rotation of said selected rotary member to establish a locked meshing engagement between at least some of said rotary members and said pinion gear members.

8. The count indicator claimed in claim 7 wherein:
said selected rotary member has an axially extending surface extending circumferentially about a major portion of said first number wheel at a substantially constant radius from the crown of said second transfer tooth and having a radially inwardly directed ramp portion intersecting said first transfer tooth intermediate the crown and the root thereof, said first tooth thereby extending radially outwardly therefrom to define in cooperation with said radially inwardly directed ramp surface a first anti-rotation locking location whereby rearward rotation of said selected rotary member will permit a pinion tooth to become wedged in said first locking location causing the numerical indication represented by the relative rotational positions of said rotary members to remain fixed through the meshing relation of said pinion gear means with at least some of said rotary member while rearward rotation of said gear train means continues.

* * * * *